Patented Apr. 6, 1937

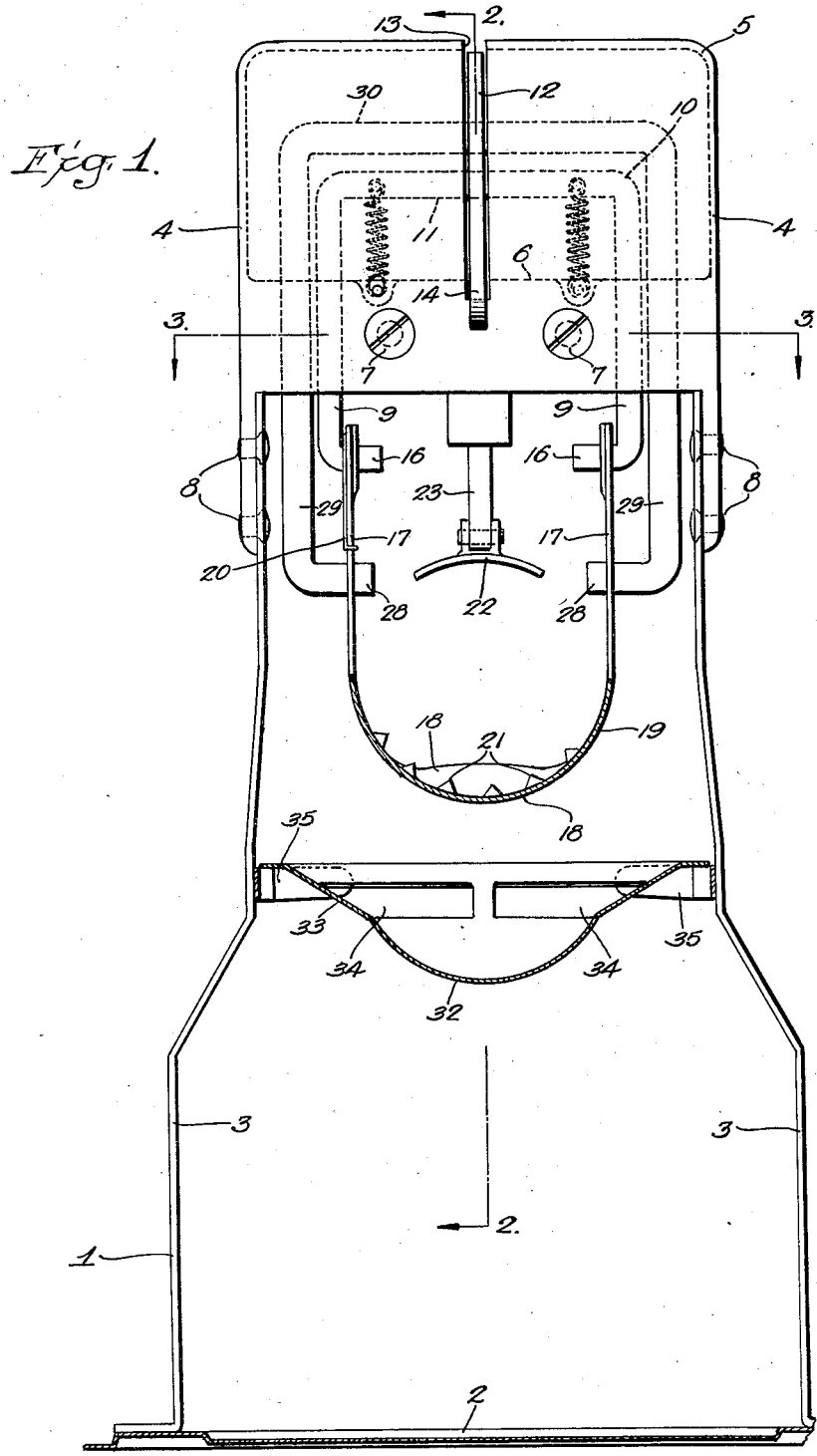

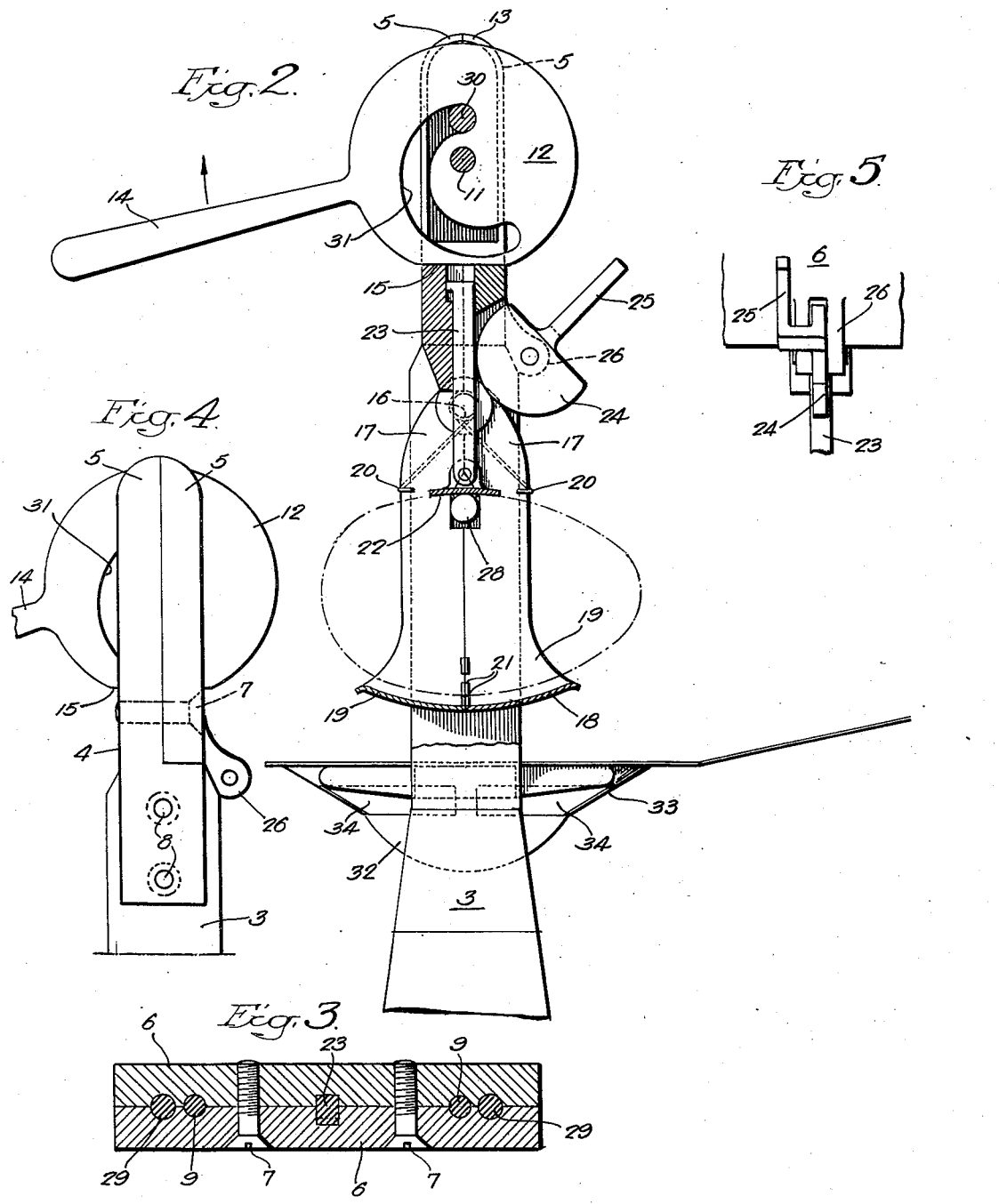

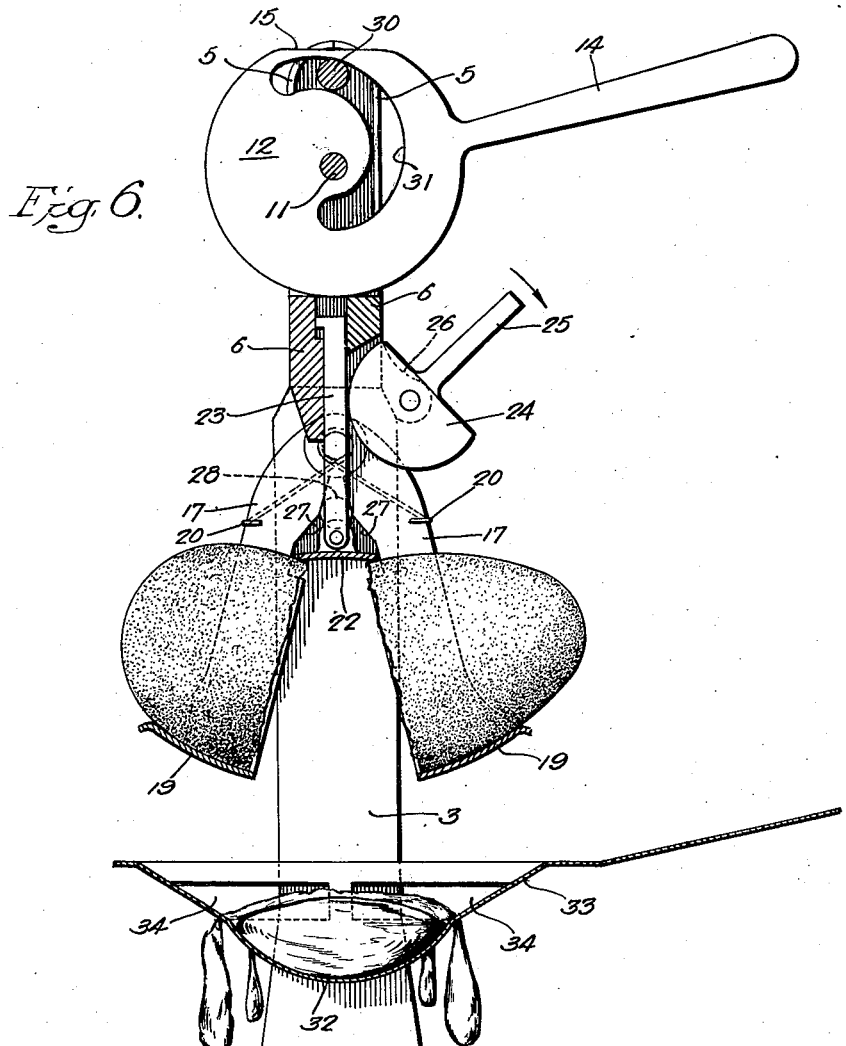

2,076,440

UNITED STATES PATENT OFFICE 2,076,440

FOOD HANDLING APPARATUS

Frank W. Amon, Philadelphia, Pa.

Application March 10, 1936, Serial No. 68,119

11 Claims. (Cl. 146—2)

This invention relates to new and useful improvements in food handling apparatus and more particularly to devices for breaking and effectively separating the yolks and whites of eggs and the like.

The principal object of the present invention is to provide a device of the character set forth which is of simple rugged construction and relatively easy to operate.

Another object of the invention is to provide a device of the stated character which may be readily and easily cleaned, and having a minimum number of parts, thus insuring comparatively inexpensive manufacture thereof.

These and other objects of the invention and the features and details of construction thereof are set forth hereinafter and shown in the accompanying drawings, in which:

Fig. 1 is a view in front elevation of a device made in accordance with the present invention.

Fig. 2 is a fragmentary view in section on line 2—2, Fig. 1, showing the device in inoperative position.

Fig. 3 is a view in section on line 3—3, Fig. 1.

Fig. 4 is a fragmentary view in side elevation of the upper end portion of the device showing certain details of construction.

Fig. 5 is a fragmentary view in rear elevation of a portion of the device showing certain structural and operative details thereof; and Fig. 6 is a view in vertical section similar to that disclosed in Fig. 2 showing the device and its associated mechanisms in their relative positions at the completion of a breaking and separating operation.

Referring now more particularly to the drawings, reference numeral 1 designates generally a frame structure comprising a base member 2 and relatively spaced vertical side frame members 3, 3 which project upwardly from opposite sides of said base. A hollow top casing-like portion 4 comprising substantially similar front and rear sections 5, 5 including cross frame portions 6 secured together by means of screws or the like 7 is secured to the upper ends of the aforementioned side members 3, 3 of the frame 1 by means of screws, rivets, or the like 8.

The side arm portions 9 of a bale 10 are slidably mounted vertically in the cross frame portions 6 of the member 4 and the cross bar 11 of said bale extends centrally through a cam member 12 which operates within a vertical groove 13 located substantially midway between the sides of said member 4. The cam 12 is actuated by means of a handle 14 and the periphery thereof is provided with a flattened portion 15 located circumferentially of said cam so that when the latter is in the inoperative position shown in Fig. 2 of the drawings said flattened peripheral portion 15 bears or rests upon the flat bottom surface of the groove 13. The lower ends 16 of the vertical side arm portions 9 of the bale 10 are turned inwardly toward each other and function as pivots for the side members 17 of an egg or like cradle 18, which as best shown in Fig. 6 of the drawings comprises two substantially similar relative movable parts or sections 19 normally held in closed or abutting relation by means of springs or like resilient elements 20.

Each of the cradle sections 19 is provided at its inner adjacent edge with upwardly projecting teeth or like elements 21 on which an egg (shown in dotted lines) is adapted to rest and be supported by means of a slightly concave shoe or abutment 22 pivotally connected to the lower end of a vertical rod, or the like 23 which is slidably mounted centrally in the aforementioned cross frame elements 6 of the top portion 4, the abutment 22 being arranged to engage the upper surface of such egg. A vertically disposed cam member 24 having an operating handle 25 is pivotally connected to a lug 26 on the rear face of the upper portion 4 and arranged with respect to the rod or shaft 23 so that when said cam 24 is rotated in the direction indicated by the arrow it engages the adjacent surface of said rod 23 and locks the same in any desired predetermined relative position with respect to the cross frame portions 6 and the surface of the egg resting on the teeth 21 in the cradle 18.

In the present instance, the inner adjacent edges of the side members 17 of the cradle sections 19 are provided with cam surfaces 27 between which extend the inturned lower ends 28 of relatively spaced vertical arms 29 slidably mounted in the cross frame portions 6 of the top member 4 outwardly adjacent the side arm portions 9 of the bale 10 and these arms 29 are connected at their upper ends by a cross bar or the like 30 which extends through an arcuate slot or opening 31 formed in the cam member 12, eccentrically thereof with respect to the previously mentioned cross bar 11 of said bale 10.

A cup or receptacle 32 having an upwardly flaring flange 33 provided with openings 34 therein is disposed below and in vertical alignment with the previously described egg cradle 18 and removably supported upon lugs or like projections 35 on the inner faces of the side frame elements 3. The cup 32 from its bottom to the lower edges of the openings 34 in the flange 33 is of a capacity just sufficient to receive the yolk of an egg of normal size, thus displacing the lighter albumen which will flow outwardly through said openings 34 and into a dish or like receptacle 36 resting upon the base portion 2 of the frame 1 below the cup 32 and in vertical alignment therewith.

In operation of the device, the shoe or abutment 22 is first raised a substantial distance above the cradle 18 and an egg is placed in the latter so that it rests upon the teeth 21 thereof after which said shoe or abutment 22 is lowered into engagement with the upper surface of the egg and locked in position by rotation of the cam member 24 in the direction of the arrow in Fig. 2. The handle 14 of the cam 12 is then actuated in a clockwise direction with respect to the drawings, and the right-hand corner of the flattened portion 15 of the periphery of said cam riding into the bottom of the vertical groove 13 in the top portion 4 raises the cross members 11 and 30 and in so doing raises the cradle 18 as well as the egg carried thereby and since the latter is held down by means of the shoe or abutment 22 the teeth 21 in said cradle 18 rupture or pierce the shell of said egg and crack the same circumferentially thereof.

Continued rotation of the cam 12 in the same direction raises the cross bar 30 still further so that the inturned lower ends 28 of the side arm portions 29 move a corresponding distance upwardly between the converging cam surfaces 27 of the side portions 17 of the cradle sections 19 and rock said sections 19 in opposite directions about the pivots 16 of the bale arms 9 and since the shell of the egg has been penetrated and cracked by the teeth 21 said shell will be opened by this relative separation of the cradle sections 19 permitting the egg including the albumen and yolk to drop downwardly between said section 19 into the cup 32. The yolk of the egg will find its seat in the cup 32 and the albumen thereof will overflow through the openings 34 into the dish 36 disposed below said yolk cup 32 thus effectively separating the albumen from the yolk.

While the invention is intended primarily for use to separate the yolks from the albumen of eggs, it will be obvious that the yolk cup 32 may be removed so that the contents of an egg opened in accordance herewith will drop directly into the dish 36 in instances where no separation of the albumen and yolks is desired, and after an egg has been opened in the foregoing manner, the device may be reset for a succeeding operation by movement of the cam handle 14 in the opposite direction to the position shown in Fig. 2 of the drawings during which movement the various elements are returned to their normal position ready to receive another whole egg.

The present invention provides a device which may be employed to effectively eliminate the inconvenient manual breaking and separation of the contents of an egg, said device being constructed so that said contents need not contact the hands of the operator, cook or housewife, and while a specific embodiment of such a device has been set forth for purposes of description, it is not intended that the invention shall be precisely limited thereto but that changes and modifications may be incorporated where within the scope of the annexed claims.

I claim:

1. In a device of the character described, a support comprising pivotally mounted sections movable toward and away from each other, an abutment arranged to engage the surface of an egg resting on said support, means for locking said abutment in the position to which adjusted, cam actuated means operable to move the support in the direction of said abutment, means forming a part of at least one section of said support arranged to crack the shell of the egg circumferentially thereof upon actuation of the support in the direction of the abutment, and means also actuated by said cam operable to pivot the sections of said support in opposite directions to open the egg and allow the contents to discharge therefrom.

2. In a device of the character described, a support comprising pivotally mounted sections movable toward and away from each other, means tending to force said sections together, an adjustable abutment arranged to engage the upper surface of an egg resting on said support, means for locking said abutment in the position to which adjusted, cam actuated means operable to move the support in the direction of the abutment, means forming a part of at least one section of said support arranged to crack the shell of the egg circumferentially thereof upon actuation of the support in the direction of the abutment, and means also actuated by said cam operable to pivot the sections of said support in opposite directions to open the egg and allow the contents to discharge therefrom.

3. In a device of the character described, a support comprising pivotally mounted sections movable toward and away from each other, means tending to force said sections together, an adjustable abutment arranged to engage the upper surface of an egg resting on said support, means for locking said abutment in the position to which adjusted, cam actuated means operable to move the support in the direction of the abutment, means forming a part of at least one section of said support arranged to crack the shell of the egg circumferentially thereof upon actuation of the support in the direction of the abutment, means also actuated by said cam operable to pivot the sections of said support in opposite directions to open the egg and allow the contents to discharge therefrom, and a receptacle positioned to receive the contents of said egg.

4. In a device of the character described, a support comprising pivotally mounted sections movable toward and away from each other, means tending to force said sections together, an adjustable abutment arranged to engage the upper surface of an egg resting on said support, means for locking said abutment in the position to which adjusted, cam actuated means operable to move the support in the direction of the abutment, means forming a part of at least one section of said support arranged to crack the shell of the egg circumferentially thereof upon actuation of the support in the direction of the abutment, means also actuated by said cam operable to pivot the sections of said support in opposite directions to open the egg and allow the contents to discharge therefrom, and a receptacle positioned to receive the contents of said egg constructed and arranged to retain only the yolk portion thereof, the albumen portion flowing outwardly thereof independently of said yolk.

5. In a device of the character described, a bodily movable support comprising pivotally mounted sections arranged for movement toward and away from each other, an abutment secured in engagement with the surface of an egg resting on said support, means operable to bodily actuate the support in the direction of said abutment, means forming a part of each of the sections of said support arranged to penetrate the shell of the egg and crack the same circumferentially thereof upon actuation of the support in the direction of the abutment, and means operable to actuate the sections of said support in opposite directions to open the egg and allow the contents to discharge therefrom.

6. In a device of the character described, a support comprising pivotally mounted sections movable toward and away from each other, means tending to force said sections together, an adjustable abutment arranged to engage the upper surface of an egg resting on said support, means for locking said abutment in the position to which adjusted, cam actuated means operable to move the support in the direction of the abutment, means forming a part of each of the sections of said support arranged to penetrate the shell of the egg and crack the same circumferentially thereof upon actuation of the support in the direction of the abutment, and means also actuated by said cam operable to pivot the sections of said support in opposite directions to open the egg and allow the contents to discharge therefrom.

7. In a device of the character described, a support comprising pivotally mounted sections movable toward and away from each other, means tending to force said sections together, an adjustable abutment arranged to engage the upper surface of an egg resting on said support, means for locking said abutment in the position to which adjusted, cam actuated means operable to move the support in the direction of the abutment, means forming a part of each of the sections of said support arranged to penetrate the shell of the egg and crack the same circumferentially thereof upon actuation of the support in the direction of the abutment, means also actuated by said cam operable to pivot the sections of said support in opposite directions to open the egg and allow the contents to discharge therefrom, and a receptacle positioned to receive the contents of said egg constructed and arranged to retain only the yolk portion thereof, the albumen portion flowing outwardly thereof independently of said yolk.

8. In a device of the character described, a bodily movable support comprising pivotally mounted sections arranged for movement toward and away from each other, an abutment arranged to engage the upper surface of an egg resting on said support, means for locking said abutment against movement, means operable to actuate the support bodily in the direction of said abutment while the latter is stationary, and means actuated by the last mentioned means operable to pivot the sections of said support in opposite directions.

9. In a device of the character described, a support comprising pivotally mounted sections movable toward and away from each other, an abutment arranged to engage the surface of an egg resting on said support, means for locking said abutment against movement when engaging the surface of the egg, cam actuated means operable to move the support in the direction of said abutment, means forming a part of at least one section of said support arranged to crack the shell of the egg circumferentially thereof upon actuation of the support in the direction of the abutment, and means also actuated by said cam operable to pivot the sections of said support in opposite directions to open the egg and allow the contents to discharge therefrom.

10. In a device of the character described, a support comprising pivotally mounted sections movable toward and away from each other, an abutment arranged to enagge the surface of an egg resting on said support, means for locking said abutment against movement when engaging the surface of the egg, cam actuated means operable to move the support in the direction of said abutment, means forming a part of at least one section of said support arranged to crack the shell of the egg circumferentially thereof upon actuation of the support in the direction of the abutment, means also actuated by said cam operable to pivot the sections of said support in opposite directions to open the egg and allow the contents to discharge therefrom, and a receptacle positioned to receive the contents of said egg.

11. In a device of the character described, a support comprising pivotally mounted sections movable toward and away from each other, adjustable means arranged to engage the surface of an egg resting on said support, means for locking said last mentioned means against movement, means operable to actuate the support in the direction of said second mentioned means while the latter is stationary, means forming a part of at least one section of said support arranged to crack the shell of the egg circumferentially thereof upon actuation of the support in the direction of the second mentioned means, and means actuated by said last mentioned means operable to pivot the sections of said support in opposite directions to open the egg and allow the contents to discharge therefrom.

FRANK W. AMON.